(12) United States Patent
Oda (10) Patent No.: US 6,249,759 B1
(45) Date of Patent: Jun. 19, 2001

(54) COMMUNICATION APPARATUS USING SPEECH VECTOR COMPARISON AND RECOGNITION

(75) Inventor: Toshiyuki Oda, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/231,633

(22) Filed: Jan. 15, 1999

(30) Foreign Application Priority Data

Jan. 16, 1998 (JP) .................................................. 10-020501

(51) Int. Cl.[7] .................................................. G10L 19/00
(52) U.S. Cl. .......................... 704/222; 704/221; 704/235
(58) Field of Search .................................. 704/200, 201, 704/237, 243, 245, 246, 247, 251, 252, 270, 221, 222, 219, 223, 235, 276, 272, 216, 217, 218

(56) References Cited

U.S. PATENT DOCUMENTS 5,167,004 * 11/1992 Netsch et al. ........................ 704/200
5,774,846 * 6/1998 Morii .................................... 704/232

FOREIGN PATENT DOCUMENTS

| 0 501 631 | 9/1992 | (EP) | G10L/5/00 |
| 0 643 520 | 3/1995 | (EP) | H04M/3/42 |
| 2 148 569 | 5/1985 | (GB) | H04M/1/66 |
| 51-93105 | 8/1976 | (JP) . | |
| 61-245785 | 11/1986 | (JP) . | |
| 2-34078 | 2/1990 | (JP) . | |
| 4-343554 | 11/1992 | (JP) . | |
| 5-83359 | 4/1993 | (JP) . | |
| 5-316203 | 11/1993 | (JP) . | |
| 6-77895 | 3/1994 | (JP) . | |
| 7-248791 | 9/1995 | (JP) | G10L/3/00 |
| 7-273841 | 10/1995 | (JP) . | |
| 7-273864 | 10/1995 | (JP) . | |
| 7-321945 | 12/1995 | (JP) . | |
| 9-84128 | 3/1997 | (JP) . | |
| WO 95/05656 | 2/1995 | (WO) | G10L/5/00 |

* cited by examiner

*Primary Examiner*—Richemond Dorvil
(74) *Attorney, Agent, or Firm*—Young & Thompson (57) ABSTRACT

A communication apparatus making use of speech vector coding scheme stores a plurality of predetermined code vectors and registered keyword data. A speech encoder codes an input speech keyword to produce coded keyword data by referring to the predetermined code vectors, after detecting a matching level between the registered keyword data and the coded keyword data, it is determined whether the coded keyword data is true or false by comparing the matching level with a predetermined criterion.

20 Claims, 7 Drawing Sheets

COMMUNICATION APPARATUS USING SPEECH VECTOR COMPARISON AND RECOGNITION

BACKGROUND OF THE INVENTION

1. Field of the Invention

The present invention generally relates to a communication apparatus such as mobile or portable telephone equipment, and relates, more particularly, to communication apparatus and control method making use of speech recognition technique.

2. Description of the Related Art

In the field of mobile or portable telephone system of Japan, Personal Digital Cellular (PDC) system is currently mainstream, wherein Vector Sum Excited Linear Prediction (VSELP) system is employed as full-rate speech coding system and Pitch synchronous innovation Code Excited Linear Prediction (PSI-CELP) system is employed as half-rate speech coding system. According to these speech coding systems, an input speech signal is compared with a code stored in a speech code book prepared in advance so that a code closest to the input speech signal is selected, and the selected code is transmitted to the other party. At the code receiving side, the received code is reproduced as a speech signal by using the same code book prepared at this side.

There has been proposed a portable telephone of the PDC system having a calling restriction function for enabling only the owner of the portable telephone to make a call. Particularly, there are disclosed telephone apparatuses for performing the calling restriction based on speech recognition in Japanese Patent Application Laid-open Publication No. 61-245785 and in Japanese Patent Application Laid-open Publication No.2-34078, respectively.

For example, according to a telephone apparatus equipped with a calling restriction device as disclosed in the publication No.2-34078, a vocalized password is registered in advance and the calling restriction is removed when the same password has been input in the same speech feature.

However, according to the above-described techniques, no mention has been made about how to decide an input speech as the same speech. Further, if a complete coincidence of registered speech data with input speech data is use as a decision criterion, an enormous volume of data is required and it is almost impossible for even a telephone owner to generate a speech of a completely identical speech frequency.

SUMMARY OF THE INVENTION

An object of the present invention is to provide a communication apparatus making use of speech recognition without requiring a large memory space and a control method for the communication apparatus.

Another object of the present invention is to provide a communication apparatus and a control method therefor, which can achieve various functions such as easy data input and voice change without requiring a large memory space.

According to a first aspect of the present invention, a communication apparatus having a speech input device includes a first memory storing a plurality of predetermined code vectors, a speech encoder for coding an input speech signal input by the speech input device to produce coded speech data by referring to the plurality of predetermined code vectors stored in the first memory, and a second memory storing registered speech data that has been produced from a predetermined speech signal by the speech encoder. The communication apparatus further includes a detector for detecting a matching level between the registered speech data and the coded speech data and a determiner for determining whether the coded speech data is true or false by comparing the matching level with a predetermined criterion.

Since truth or falsehood of the coded speech data is decided based on a result of a comparison between the matching level and the predetermined criterion, it is possible to obtain an appropriate level of precision of the decision depending on the predetermined criterion.

Further, the communication apparatus is normally set to a use restriction state and the use restriction state is removed when it has been determined that the coded speech data is true. Therefore, by setting the predetermined criterion to a desired level, the use restriction condition can be made strict or mild.

According to a second aspect of the present invention, a communication apparatus includes a transmitter for transmitting a transmission message by radio, a speech input device for inputting a speech signal, a keypad for inputting a character code, and a display for displaying information. The communication apparatus further includes a memory storing a plurality of predetermined code vectors each including a group code showing a kind of syllable and a feature code showing a difference between speech features, a speech encoder for coding an input speech signal input by the speech input device to produce an input speech code consisting of a group code and a feature code by referring to the plurality of predetermined code vectors stored in the memory, and a controller controlling the display and the transmitter such that a character corresponding to the group code of the input speech code is displayed as a transmission message in the display and the transmission message displayed is transmitted by the transmitter when the transmission message has been completed. As the transmission message can be created through the speech input device, the complexity of message creation can be reduced.

According to a third aspect of the present invention, a communication apparatus includes a transmitter for transmitting a transmission message by radio and a speech input device for inputting a speech signal. The communication apparatus further includes a memory storing a plurality of predetermined code vectors each including a group code showing a kind of syllable and a feature code showing a difference between speech features, a speech encoder for coding an input speech signal input by the speech input device to produce a transmission speech code consisting of a group code and a feature code by referring to the plurality of predetermined code vectors stored in the memory, and a controller controlling the speech encoder such that the transmission speech code is selected from the predetermined speech codes, wherein the transmission speech code is different from a predetermined speech code closest to the input speech signal with respect to only feature code.

Since speech communication can be carried out with changed voice, the communication apparatus can be utilized as a mischievous call protection function

DETAILED DESCRIPTION OF THE PREFERRED EMBODIMENTS

Figure 1:
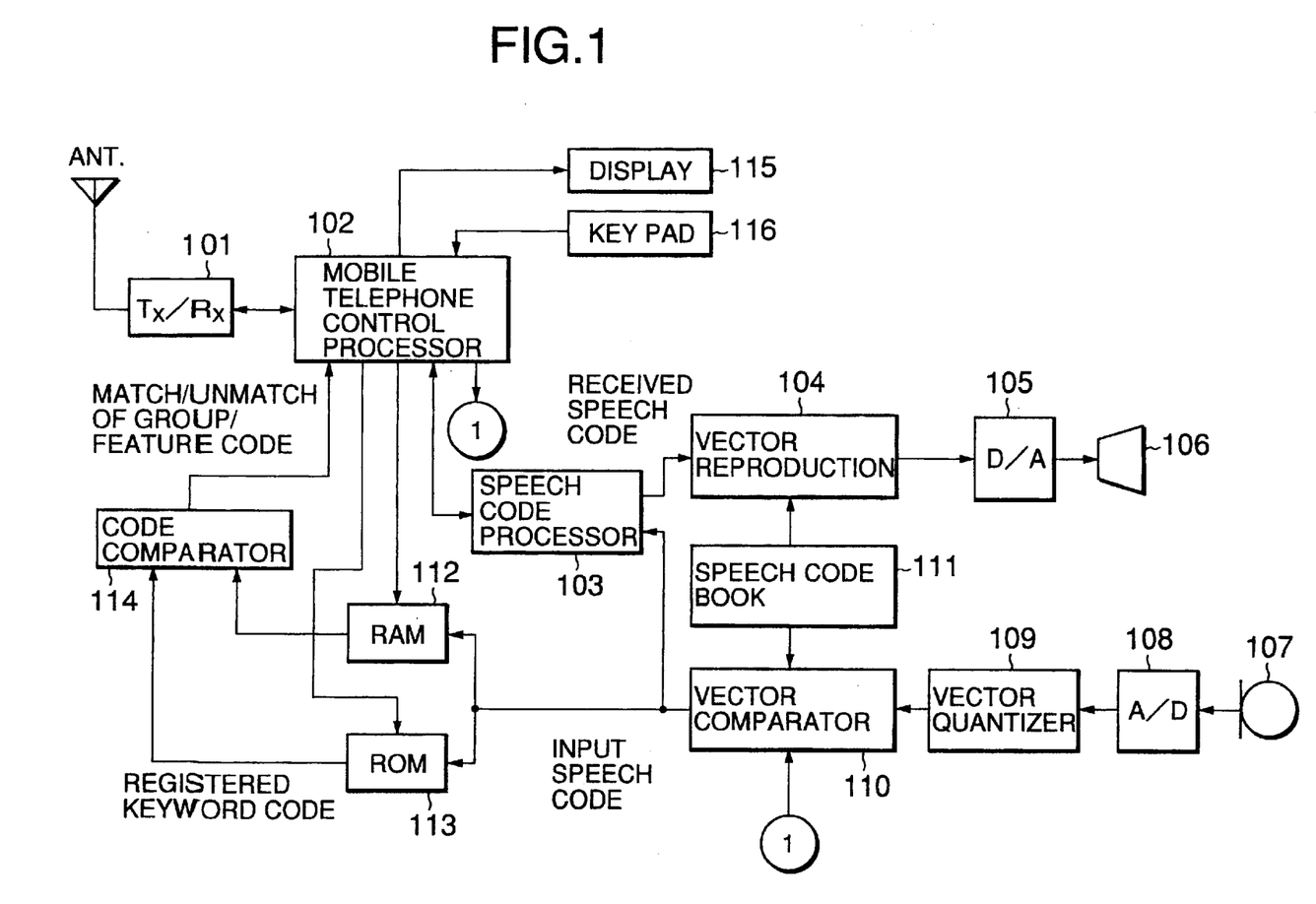
FIG. 1 is a block diagram for showing a schematic structure of a portable telephone apparatus in one embodiment of a communication apparatus according to the present invention.

Referring to FIG. 1, a mobile telephone apparatus is provided with a transceiver 101 and a mobile telephone control processor 102. The transceiver 101 includes a transmission power amplifier connected to an antenna, a receiving amplifier and a modem (modulator and demodulator). When receiving a radio signal from the antenna, the transceiver 101 demodulates it to produce received data. When inputting a transmission data from the mobile telephone control processor 102, the transceiver 101 modulates a carrier according to the transmission data to produce a transmission radio signal.

The mobile telephone control processor 102 is a program-controlled processor, which runs a control program to perform the channel control of mobile telephone and other various kinds of controls including the calling restriction control as described later. In other words, the mobile telephone control processor 102 carries out an overall operation control of the portable telephone apparatus by executing the control program stored in a read-only memory (not shown).

The mobile telephone control processor 102 determines whether an input password is acceptable and, if acceptable, the calling restriction is released. Further the mobile telephone control processor 102 determines whether the received data is addressed to the telephone apparatus itself and, if it is addressed thereto, extracts a speech code from the received data. The extracted speech code is output to a speech code processor 103. On the other hand, when inputting a transmission speech code from the speech code processor 103, the mobile telephone control processor 102 produces transmission data according to the predetermined channel control scheme.

The speech code processor 103 performs a conversion between radio-channel sequence data and a speech code defined by a group code and a feature code as will be described later and outputs a received speech code to a vector reproduction section 104. The vector reproduction section 104 converts the received speech code into a speech vector by referring to code vectors stored in advance in a speech code book 111. The received speech vector reproduced is converted into an analog speech signal by a digital-to-analog (D/A) converter 105, and the analog speech signal is converted to voice by a speaker 106.

On the other hand, a speech signal input by a microphone 107 is converted into a digital speech signal by an analog-to-digital (A/D) converter 108. The digital speech signal is vector-quantized by a vector quantizer 109, and an input speech vector thereof is output to a vector comparator 110.

The vector comparator 110 compares a code vector stored in the speech code book 111 with the input vice vector to select a code vector closest to the input speech vector Alternatively, under control of the mobile telephone control processor 102, the vector comparator 110 can select a code vector other than the code vector closest to the input speech vector. The recognition code of the selected code vector is output as an input speech code to the speech code processor 103. The speech code processor 103 converts the input speech code into data following the radio channel sequence. In this case, it is also possible to replace only a feature code of the input speech code with a different feature code to produce a transmission speech code having the same word with different voice as if another person speaks. Such a voice change function can also be achieved by the vector comparator 110.

Further, the input speech code generated by the vector comparator 110 is also output to a speech comparator which is comprised of a random access memory (RAM) 112, a programmable read-only memory (ROM) 113 and a code comparator 114. When a password or a keyword is input through the microphone 107, the RAM 112 stores the input speech code received from the vector comparator 110. The ROM 113 may be an electrically-erasable programmable ROM (EEPROM). A registered password or keyword code is stored in the ROM 113 when the mobile telephone apparatus is set to a calling restriction setting mode. The code comparator 114 compares an input speech code stored in the RAM 112 with the registered keyword code stored in the ROM 113, and outputs a result of the comparison to the mobile telephone control processor 102. The result of the comparison indicates whether the input speech code matches the registered keyword code.

The mobile telephone control processor 102 determines whether the calling restriction is to be removed or not based on the result of the comparison between the input speech code and the registered keyword code. The details will be described later. It is also possible to implement the code comparator 114 by running the control program on the mobile telephone control processor 102.

The mobile telephone control processor 102 has a display 115 for displaying necessary information connected thereto. A liquid crystal display may be used as the display 115. A keypad 116 is also connected to the mobile telephone control processor 102. The keypad 116 includes a ten-key for dialing and other functional keys.

Since each syllable of input speech can be specified by the vector comparator 110 as described later in detail, it is possible to input a message to be transmitted to a selective call receiver or a pager, for example. More specifically, a message in speech is input through the microphone 107 and the message is displayed in the display 115. Thereafter, if necessary, the message is modified by key operation of the keypad 116.

The above-described mobile telephone apparatus according to the present invention can be realized by simply adding a memory space of the RAM 112 and the ROM 113 and the code comparator 114 to an existing mobile telephone apparatus. The rest of the circuits are essentially equipped in the existing mobile telephone apparatus, and therefore, a minimum addition of circuits can realize the mobile telephone apparatus according to the present invention.

Vector Coding

An analog speech signal input by the microphone 107 is converted into a digital signal by the A/D converter 108, and the digital signal is converted into a vector quantity (an input speech vector) corresponding to the input speech by the vector quantizer 109.

The vector comparator 110 compares a code vector stored in the speech code book 111 with the input speech vector and selects a code vector closest to the input speech vector. The input speech code of the input speech vector is output to the speech code processor 103.

Figure 2:
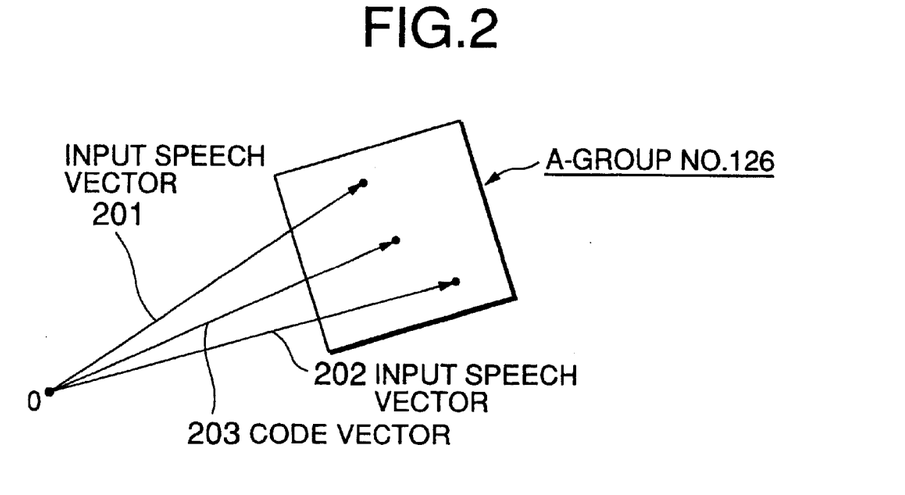
FIG. 2 is a schematic diagram for explaining a vector coding of a speech employed in the present invention.

As shown in FIG. 2, for example, if input speech vectors 201 and 202 are included in a region of a code vector 203 of "A-group No. 126", both of the input speech vectors 201 and 202 are recognized as one input speech code represented by the code vector 203.

Figure 3:
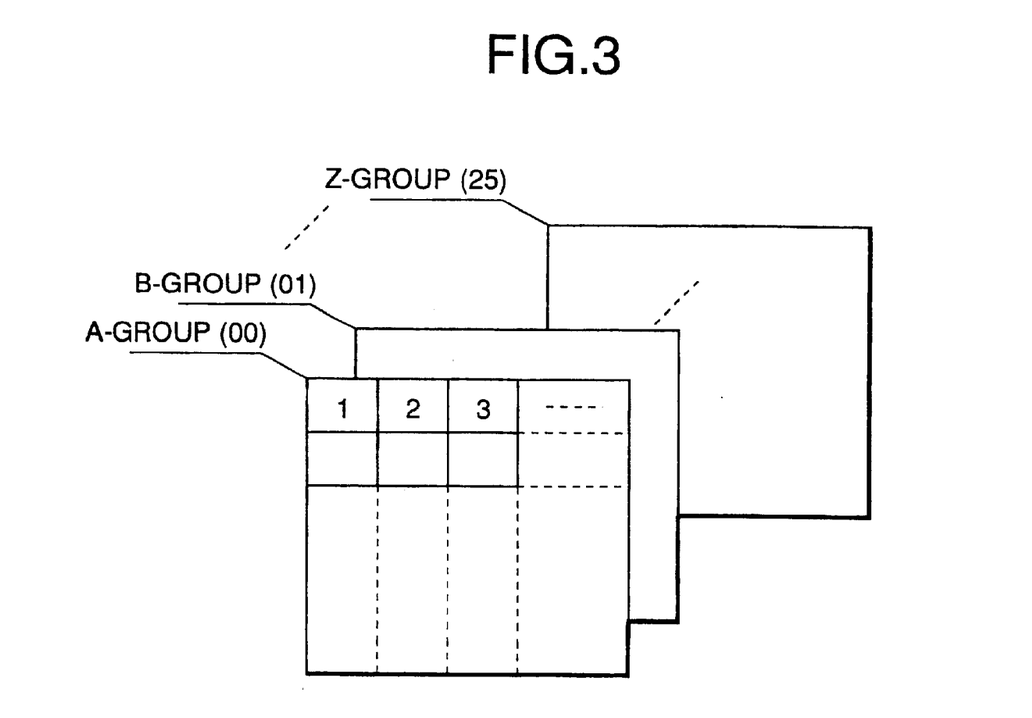
FIG. 3 is a schematic diagram for explaining the contents of a speech code book used in the present invention.

As shown in FIG. 3, in the speech code book 111, group codes are allocated respectively to 26 kinds of syllables in English or to 47 kinds of syllables in Japanese (the so-called Japanese fifty syllables) and feature codes are allocated to a plurality of different speech vectors for each group. For example, in decimal system, a group code of "00" is allocated to the A-group, a group code of "01" is allocated to the B-group, and so on. The speech of a feature code "1" is different from that of a feature code "2" although they are vocalized as the same "A".

Figure 4A:
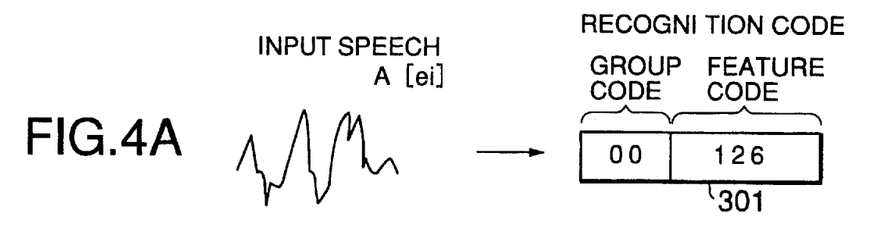
FIG. 4A is a schematic diagram that shows one example for explaining a relationship between an input speech vocalized by a person and a coded recognition code according to the present invention.

Referring to FIG. 4A, it is assumed that, when a certain person vocalizes "A", the recognition code 301 of a code vector (in this case, the recognition code is represented by "00126") is selected as one closest to an input speech vector caused by the person. In this case, the input speech can be specified as the syllable "A" by the group code "00", and further, the speech can be specified by the feature code "126". This recognition code "00126" is output as an input speech code to the speech code processor 103.

Figure 4B:
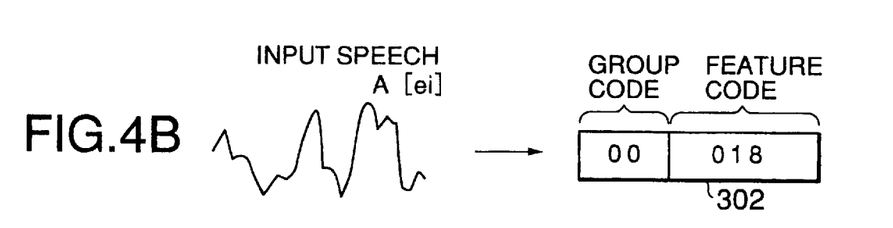
FIG. 4B is a schematic diagram that shows another example for explaining a relationship between an input speech vocalized by a different person and a coded recognition code according to the present invention.

As shown in FIG. 4B, when a different person vocalizes "A", the recognition code 302 of a code vector (in this case, the recognition code is represented by "00018") is selected as one closest to an input speech vector caused by the person. In this case, the input speech can be specified as the syllable "A" by the group code "00", and further, the speech can be specified by the feature code "018". This recognition code "00018" is output as an input speech code to the speech code processor 103.

Setting of Use Restriction

At first, the owner of the mobile telephone apparatus operates the keypad 116 to set it to the calling restriction setting mode. With this operation, the mobile telephone control processor 102 sets the ROM 113 to a rewrite mode. Then, the owner vocalizes in his or her own speech a keyword or a password of a predetermined number of words $N_p$ to the microphone 107. When the owner has vocalized a keyword consisting of five syllables "ABCDE", for example, a code vector closest to each syllable is selected as an input speech code as described before. Thus, five input speech codes are registered as a registered keyword code together with the word number $N_p$ in the ROM 113.

In this case, it is desirable that a condition for removal of the calling restriction is set through the keypad 116. In the present embodiment, a threshold value $C_{TH}$ of a completely matching number of input syllables is set to a desired value, and depending on the set value the calling restriction can be made either strict or mild as described later.

Removal of use Restriction

For removing the calling restriction, the mobile telephone apparatus is set to a calling restriction removal mode through the keypad 116.

Figure 5:
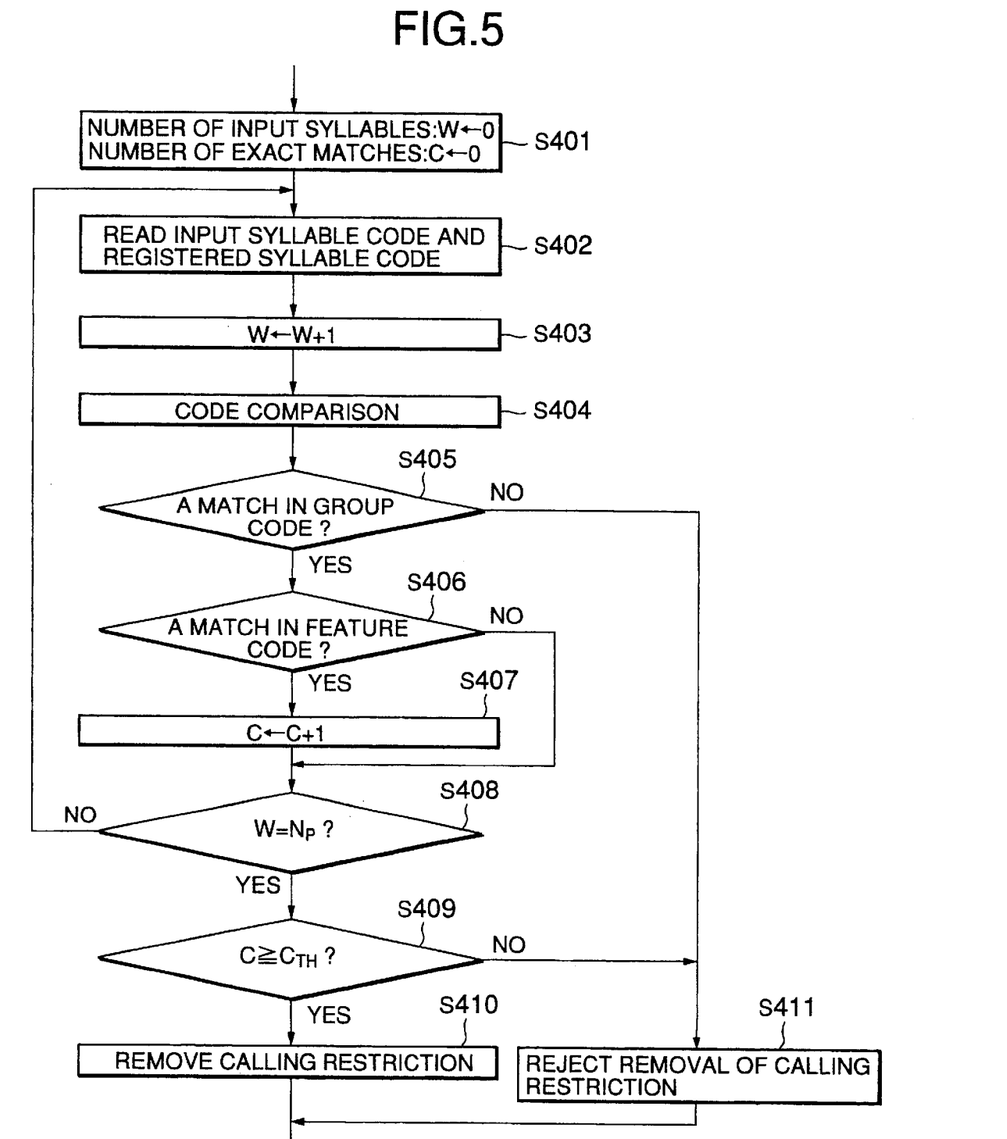
FIG. 5 is a flowchart for showing a calling restrictions method in a first embodiment of a communication method according to the present invention.

Referring to FIG. 5, in this mode, the mobile telephone control processor 102 initializes a variable W indicating the number of input syllables and a variable C indicating a completely matching number of input syllables (step S401). Next, a user vocalizes a keyword consisting of $N_p$ syllables to the microphone 107 as in the case of the calling restriction setting mode.

The mobile telephone control processor 102 stores the respective input speech codes onto the RAM 112 and then controls the RAM 112 and ROM 113 such that the respective W-th syllable codes of the input speech codes and the registered keyword codes are output to the code comparator 114 (step S402). When one syllable code is input, the mobile telephone control processor 102 increments the variable W (step S403). Then, the code comparator 114 compares the input speech code with the registered keyword code (S404). If a group code and a subsequent feature code match those of the registered code, respectively (YES at steps S405 and S406), the completely matching number C is incremented (step S407).

If the group code does not match the group code of the registered keyword (NO at S405), the calling restriction removal is rejected instantly as the keyword itself is different (step S411). If the group code matches but the feature code does not match (NO at step S406), the completely matching number C is not incremented. The above steps S402 to S407 are repeatedly performed until the variable W reaches the predetermined value $N_p$ (NO at step S408).

When the variable W has reached the predetermined value $N_p$ (YES at S408), the completely matching number C is compared with the preset threshold value $C_{TH}$ (step S409). If the completely matching number C is equal to or greater than the threshold value $C_{TH}$ (YES at S409), it is determined that a correct keyword has been input in speech by the owner and therefore the calling restriction is removed (step S410). Accordingly, the user can make a call by dialing through the keypad 116.

On the other hand, if the completely matching number C is smaller than the threshold value $C_{TH}$ (NO at S409), it is determined that a correct keyword has been input but has been input in speech by a person other than the owner, and the request for removal of the calling restriction is rejected (step S411). Accordingly, the person cannot make a call.

Setting of Restriction Removal Condition

Setting the threshold value $C_{TH}$ at a value equal to the keyword number $N_p$ brings about a certain difficulty. It is not easy for even the owner to input a group code and a feature code to coincide completely with a registered keyword code for all the syllables, and there may arise a situation where even the owner cannot remove the calling restriction. In other words, this setting may be effective for a user who is confident in vocalizing always at the same voice feature.

It is effective in a certain sense to set the threshold value $C_{TH}$ at zero. For example, if a keyword is intentionally told to a specific person other than the owner, this person, although not the owner, can make a call by vocally inputting the correct keyword.

Accordingly, it would be desirable to set the threshold value $C_{TH}$ at a suitable value equal to or greater than zero and less than $N_p$. For example if the threshold value $C_{TH}$ is set at 2 for a keyword "ABCDE". It is possible to remove the calling restriction if only "A, C and E" completely match their feature codes even if the other feature codes of "B and D" unmatch, respectively.

If the threshold value $C_{TH}$ is set at a large value in this way, a possibility that a person other than the owner can use the same telephone becomes low but, at the same time, a possibility that even the owner is rejected becomes higher. On the contrary, if the threshold value $C_{TH}$ is set at a small value, a possibility that a person other than the owner removes the calling restriction becomes higher. Accordingly, it is desirable to set the threshold value $C_{TH}$ at a suitable value taking into account the usage pattern. In other words, since the threshold value $C_{TH}$ can be set at a desirable value, there is an effect that the mobile telephone can be used in various ways depending on the setting of the threshold value $C_{TH}$.

Message Creation

As described above, since an input syllable can be specified according to the group code of its recognition code, it is possible to use it to create a message to be transmitted to a selective call receiver or a pager, for example. At first, the mobile telephone apparatus is set to a message creation mode, and a message is input in speech through the microphone 107.

Figure 6:
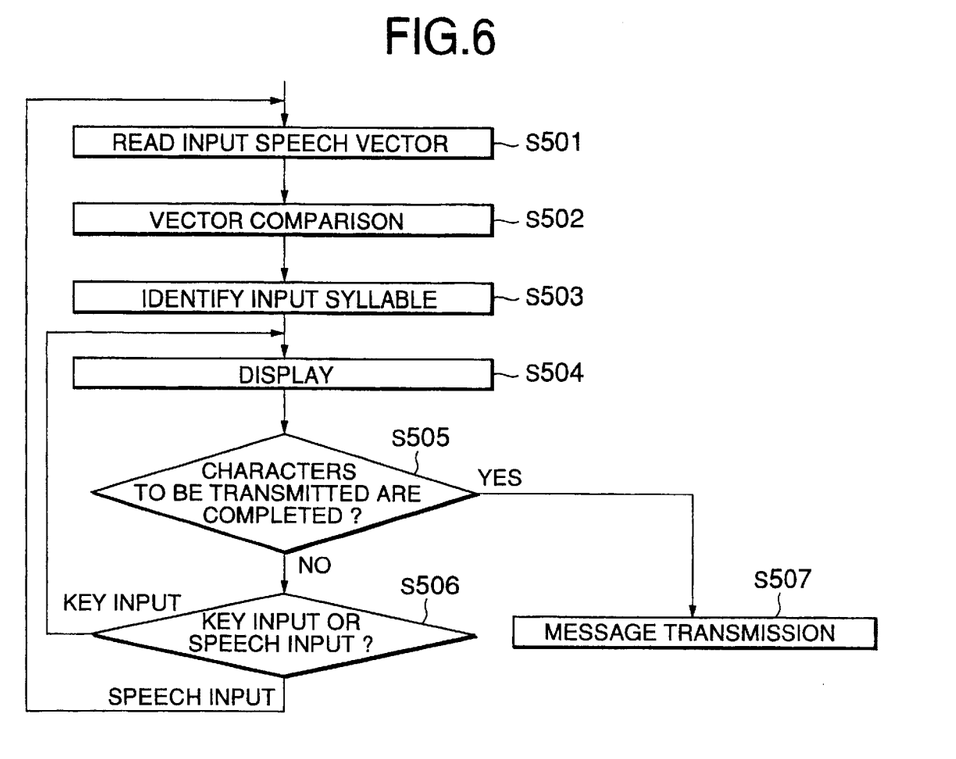
FIG. 6 is a flowchart for showing a method of preparing a message in a second embodiment of a communication method according to the present invention.

Referring to FIG. 6, an input speech vector is produced by the vector quantizer 109 and is output to the vector comparator 110 (step S501). The vector comparator 110 compares the input speech vector with a code vector stored in the speech code book 111, so that an input speech code is produced (step S502). The speech code processor 103 extracts a group code from the input speech code to identify the input syllable (step S503), and sends the group code to the mobile telephone control processor 102. The mobile telephone control processor 102 produces a display image of the group code and the display 115 displays the input syllable character according to the group code (step S504).

After the character input in speech is displayed in the display 115, the mobile telephone control processor 102 waits for a user's command indicating whether the displayed characters can be transmitted (step S505). If there is an addition to or a correction of characters to be transmitted (NO at step S505), an input of the next syllable code is awaited while determining whether it is a key input or a speech input (step S506). When an input has been made by the keypad 116, the control goes back to the step S504 to display the key input character, and when there has been a speech input, the control goes back to the above-described step S501. When a transmission message has been completed (YES at step S505) by repeating the above-described steps, the mobile telephone control processor 102 transmits this message displayed on screen to the destination pager through the transceiver 101 (step S507).

Since the speech recognition function can be used for creation of a transmission message as described above, it becomes possible to reduce the complexity of a key input in the case of inserting or adding symbols that cannot be input in speech.

Figure 7:
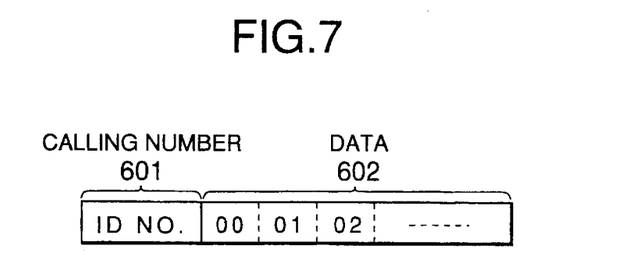
FIG. 7 is a format view for showing one example of a selective call signal prepared by the message preparation method shown in FIG. 6.

Referring to FIG. 7, the above message is stored as a speech code in a data field 602 following a calling number field 601. In this example, a code of "000102 . . . " in the data field 602 indicates a message of "ABC . . . ".

Voice Change Control

As described above, it is possible to change voice by replacing only a feature code with a different feature code by the speech code processor 103 as described above.

Figure 8:
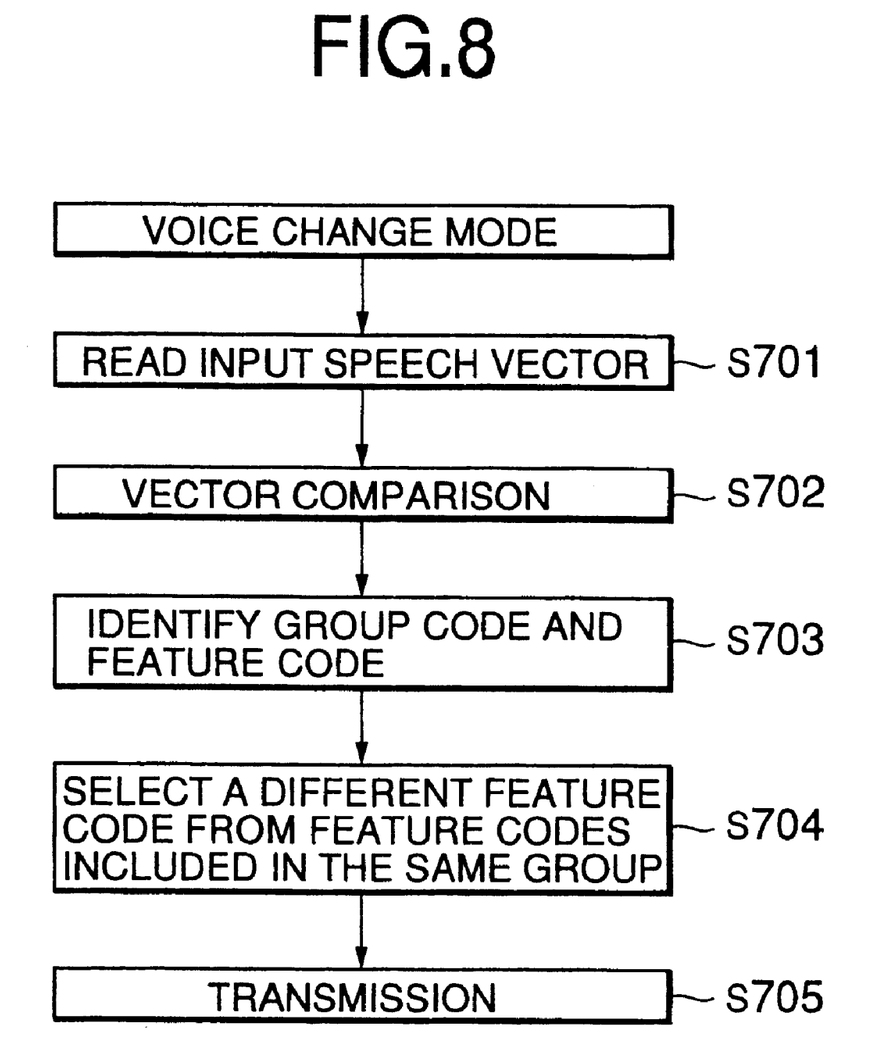
FIG. 8 is a flowchart for showing a method of changing a speech in a third embodiment of a communication method according to the present invention.

Referring to FIG. 8, after the mobile telephone apparatus is set to a voice change mode, an input speech vector is produced by the vector quantizer 109 and is output to the vector comparator 110 (step S701). The vector comparator 110 compares the input speech vector with a code vector stored in the speech code book 111 (step S702). Thus, a code vector closest to the input speech vector is selected, and a group code and a feature code are specified (step S703).

Thereafter, when receiving the group code and the feature code, the speech code processor 103 selects a different feature code in the same group code, and outputs a result to the mobile telephone control processor 102 (step S704). Therefore, the voice-changed speech data is transmitted (step S705). In other words, the speech code of different voice with the same syllable is transmitted. For example, if the feature code is shifted to a lower frequency, it is possible to change the voice of a woman into that of a man, which can be utilized as a mischievous call protection function.

Since the selection of a code vector in the vector comparator 110 can also be controlled by the mobile telephone control processor 102, when the mobile telephone apparatus has been set to the voice change mode, the mobile telephone control processor 102 can set the vector comparator 110 to select a code vector of a quite different voice for the same group.

Selective Call Receiver

Figure 9:
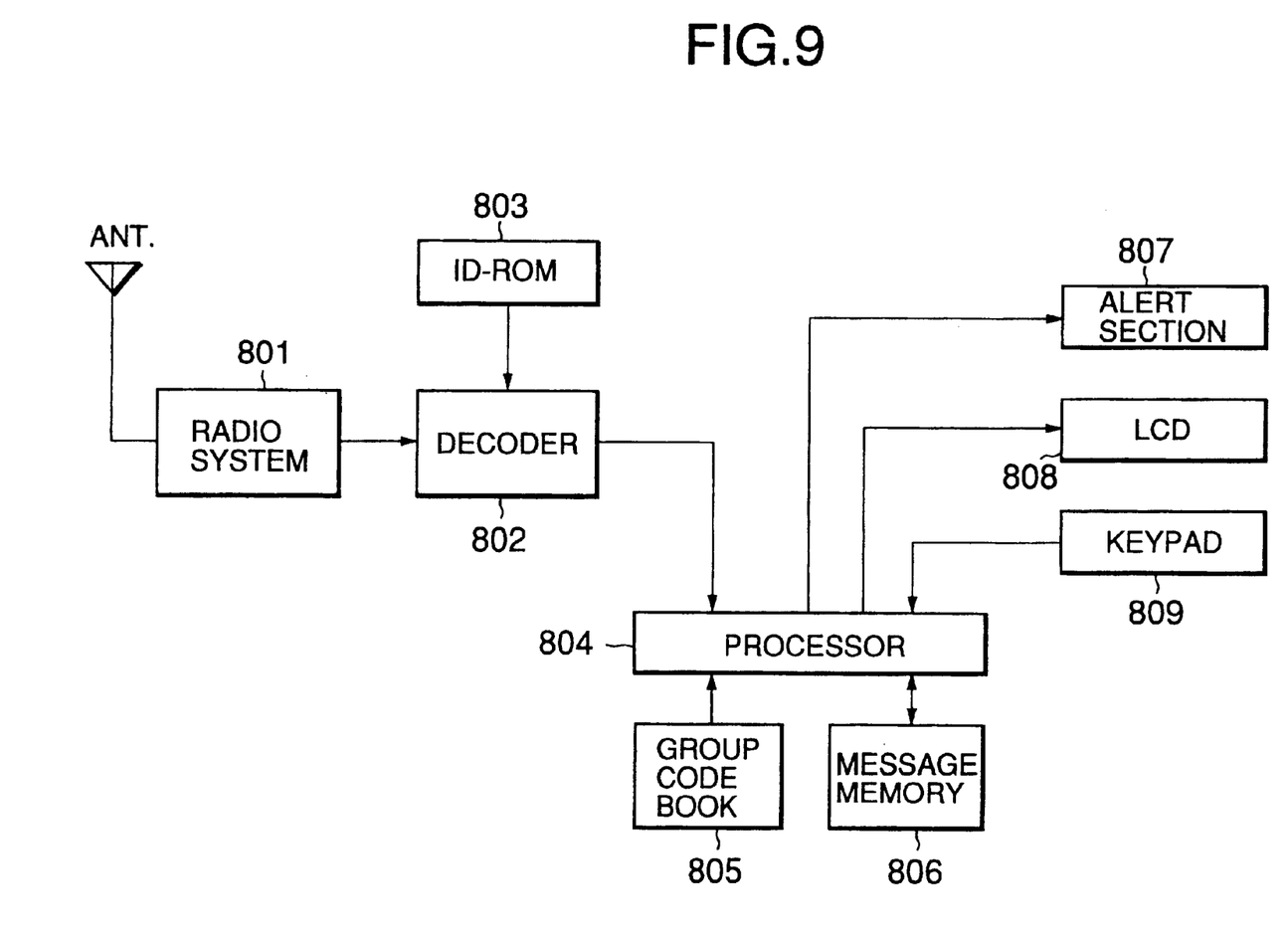
FIG. 9 is a block diagram for showing a schematic structure of a selective call receiver in a second embodiment of a communication apparatus according to the present invention.

Referring to FIG. 9, a radio signal received through an antenna is input to a radio system 801 where the radio signal is demodulated to a base-band signal which is output to a decoder 802. The decoder 802 decodes the base-band signal and, if a selective calling number of the decoded received signal matches an own identification number stored in ID-ROM 803, then the data following the selective calling number is output to a processor 804 as received data.

The processor 804 has a group code book 805 and a message memory 806 connected thereto. The processor 804 decodes the received data by referring to the group code book 805 storing a plurality of predetermined group codes. For example, if the received data is "000102 . . . " as shown in FIG. 7, a message of "ABC . . . " can be obtained. The decoded message is stored in a message memory 806. As the group code book 805 needs to store only group codes, this does not require a large memory space.

When the processor 804 has detected a received data call, the call incoming is reported to a user by driving an alert section 807 for generating sound or vibration or light-blinking. A received message is displayed in a LCD display 808, and the alert stop and other instructions are given through a keypad 809. Thus, the selective call receiver can receive a message from the mobile telephone apparatus and then displays the message on screen, wherein the message has bee created by utilizing the speech recognition function of the mobile telephone apparatus as described in FIG. 6.

What is claimed is:

1. A communication apparatus provided with a speed input device, comprising:

a first memory storing a plurality of predetermined code vectors, each of the code vectors comprising a code first part and a code second part, the code first part corresponding to one of plural genus speech characteristics and the code second part corresponding to a species voice feature of the one genus speech characteristic;

a speech encode for coding an input speech signal input by the speech input device to produce coded speech data by referring to the plurality of predetermined code vectors stored in the first memory, each of the coded speech data comprising a speech first part and a speech second part, the speech first part corresponding to a single one of the plural genus speech characteristics and the speech second part corresponding to one of the species voice features of the single one genus speech characteristic;

a second memory storing registered speech data that has been produced from a predetermined speech signal by the speech encoder;

a detector for detecting a matching level between the registered speech data and the coded speech data; and a determiner for determining whether the coded speech data is true or false by comparing the matching level with a predetermined criterion.

2. The communication apparatus accordingly to claim 1, wherein the predetermined criterion is previously set at a desired level for matching of speech second parts with corresponding second parts of the registered speech data in the second memory.

3. The communication apparatus according to claim 1, wherein the registered speech data each comprise a registered first part and a registered second part, each registered first part corresponding to a particular one of the plural syllable codes and the registered second part corresponding to one of plural voice features of the particular one syllable code, and the matching level is a matching number of syllable codes between the registered speech data and the coded speech data based on matching of corresponding registered first parts and speech first parts.

4. The communication apparatus according to claim 3, wherein the predetermined criterion is previously set at a desired threshold value.

5. The communication apparatus according to claim 1, further comprising a controller controlling such that the communication apparatus is normally set to a use restriction state and the use restriction state is removed when it has been determined that the coded speech data is true.

6. The communication apparatus according to claim 1, wherein the registered speech data and the coded speech data each comprise a data format with a group code first part indicating a kind of syllable and a feature code second part indicating particular voice features representative of the syllable of the data group code first part.

7. A communication apparatus comprising:
a transmitter for transmitting a transmission message by radio;
a speech input device for inputting a speech signal;
a keypad for inputting a character code;
a display for displaying information;
a memory storing a plurality of predetermined code vectors,
each code vector including a group code first part showing a kind of syllable and a feature code second part showing a difference between speech features relating to the syllable of the group code first part;
a speech encoder for coding an input speech signal input by the speech input device to produce an input speech code consisting of a group code first part and a feature code second part by referring to the plurality of predetermined code vectors stored in the memory; and
a controlled controlling the display and the transmitter such that a character corresponding to the group code first part of the input speech code is displayed as a transmission message in the display and the transmission message displayed is transmitted by the transmitter when the transmission message has been completed.

8. The communication apparatus according to claim 7, wherein the transmission message displayed in the display is changeable through one of the speech input device and the keypad.

9. The communication apparatus according to claim 7, further comprising:
a second memory storing a predetermined number of registered speech codes that have been produced from a predetermined speech signal by the speech encoder, each of the registered speech codes being a two-part record comprising a group code part and a feature code part;
a detector for detecting a matching level between the registered speech codes and in put speech codes;
a determiner for determining whether the input speech codes are true or false by comparing the matching level with a predetermined criterion; and
a controller controlling such that the communication apparatus is normally set to a calling restriction state and the calling restriction state is removed when it have been determined that the input speech codes are true.

10. The communication apparatus according to claim 9, wherein the matching level is a matching number of speech codes between the registered speech data and the input speech codes.

11. The communication apparatus according to claim 10, wherein the predetermined criterion is previously set at a desired threshold value.

12. A communication apparatus comprising:
a transmitter for transmitting a transmission message by radio;
a speech input device for inputting a speech signal;
a memory storing a plurality of predetermined code vectors each of the code vectors being a two-part record including a group code part showing a particular syllable and a feature code part showing a difference between speech features of the particular syllable;
a speech encoder for coding an input speech signal input by the speech input device to produce a transmission speech code comprising two-part records of a group code part and a feature code part by referring to the plurality of predetermined code vectors stored in the memory; and
a controller controlling the speech encoder such that the transmission speech code is selected from the predetermined speech codes, wherein the transmission speech code is different from a predetermined speech code closest to the input speech signal with respect to only feature code.

13. The communication apparatus according to claim 12, further comprising:
a second memory storing a predetermined number of registered speech codes that have been produced from a predetermined speech signal by the speech encoder, each of the registered speech codes comprising plural part records of a group code part and a feature code part;

a detector for detecting a matching level between the registered speech codes and input speech codes based on a comparison of corresponding one of the group code parts and the feature code parts;

a determiner for determining whether the input speech codes are true or false by comparing the matching level with a predetermined criterion; and a controller controlling such that the communication apparatus is normally set to a calling restriction state and the calling restriction state is removed when it has been determined that the input speech codes are true.

14. The communication apparatus according to claim 13, wherein the matching level is a matching number of group code parts between the registered speech data and the input speech codes.

15. The communication apparatus according to claim 14, wherein the predetermined criterion is previously set at a desired threshold value.

16. A control method for the communication apparatus provided with a speech input device, a code book memory storing a plurality of predetermined code vectors, and a registration memory storing registered speech data that has been produced from a predetermined speech signal, comprising the steps of:

coding an input speech data input by the speech input device to produce coded speech data by referring to the plurality of predetermined code vectors;

detecting a matching level between the registered speech data and the coded speech data; and determining whether the coded speech data is true or false by comparing the matching level with a predetermined criterion, wherein the coded speech data is a two-part record, each of the two parts representing the same speech characteristic.

17. The method according to claim 16, further comprising the steps of:

normally setting the communication apparatus to a use restriction state: and removing the use restriction state when it has been determined that the coded speech data is true.

18. The method according to claim 16, wherein the predetermined criterion is previously set at a desired level.

19. A control method for a communication apparatus comprising:

a transmitter for transmitting a transmission message by radio;

a speech input device for inputting a speech signal;

a keypad for inputting a character code;

a display for displaying information;

a memory storing a plurality of predetermined code vectors each vector including a group code part showing a kind of syllable and a feature code part showing a difference between speech features of that kind of syllable; and a speech encoder for coding an input speech signal input by the speech input device to produce an input speech code consisting of a group code part and a feature code part by referring to the plurality of predetermined code vectors stored in memory, comprising the steps of:

displaying a character corresponding to the group code part of the input speech code as a transmission message in the display; and transmitting the transmission message displayed by the transmitter when the transmission message has been completed.

20. A control method for a communication apparatus comprising:

a transmitter for transmitting a transmission message by radio;

a speech input device for inputting a speech signal;

a memory storing a plurality of predetermined code vectors each vector being represented by a code vector record comprising a group code portion showing a kind of syllable and a feature code portion showing a difference between speech features of the corresponding kind of syllable; and a speech encoder for coding an input speech signal input by the speech input device to produce a transmission speech code consisting of a group code portion and a feature code portion by referring to the plurality of predetermined code vectors stored in the memory, comprising the steps of:

selecting one of the plural code vectors from the predetermined code vector to produce the transmission message, wherein the transmission speech code and the selected vector have the same group code portion and different feature code portions; and transmitting the transmission message through the transmitter.

\* \* \* \* \*